Aug. 30, 1966 G. A. SCHMIDT ETAL 3,269,334
TURNTABLE
Filed July 27, 1964 2 Sheets-Sheet 1

INVENTORS.
GEORGE A. SCHMIDT
ANDREW ABOLINS
BY PAUL J. SENG

Millman and Jacobs
ATTORNEYS

Aug. 30, 1966  G. A. SCHMIDT ETAL  3,269,334
TURNTABLE
Filed July 27, 1964  2 Sheets-Sheet 2
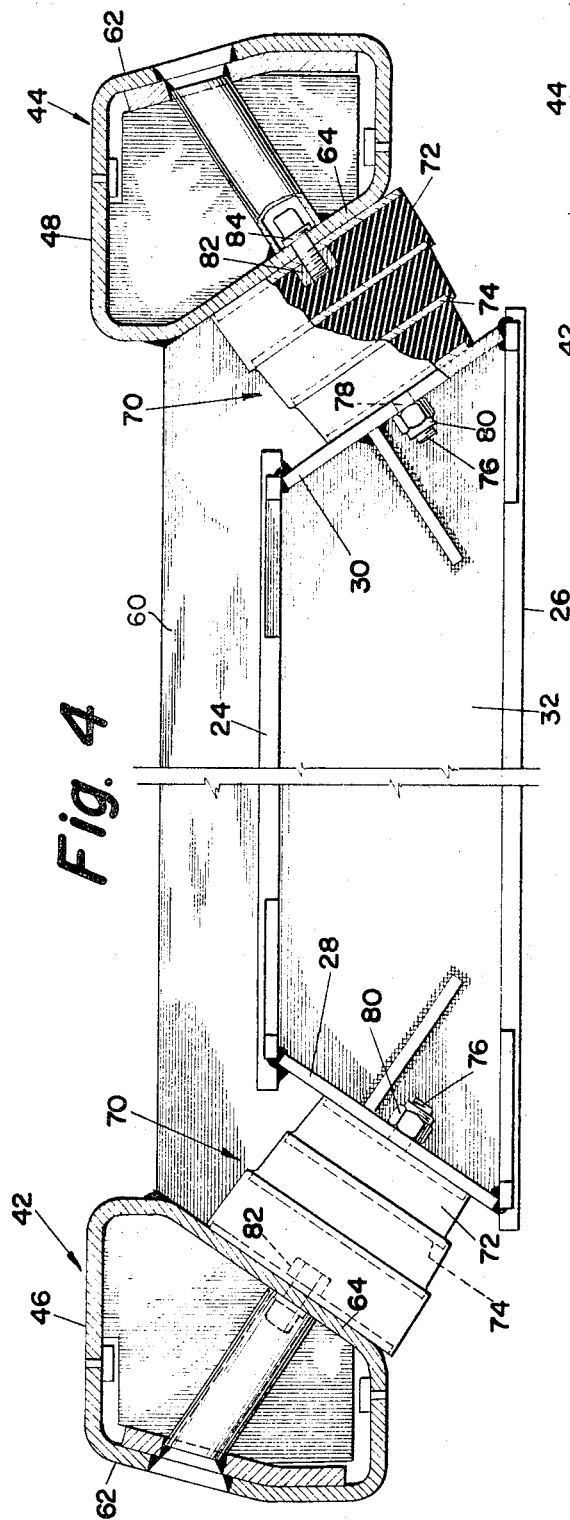
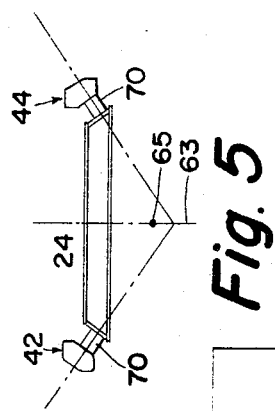
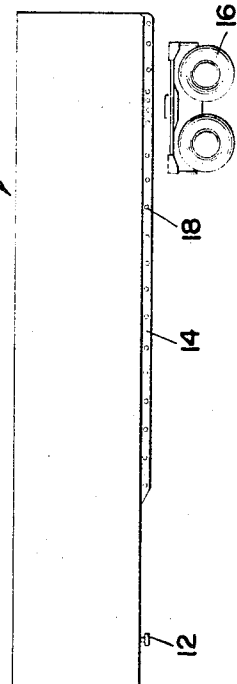
INVENTORS
GEORGE A. SCHMIDT
ANDREW ABOLINS
BY PAUL SENG
*Millman and Jacobs*
ATTORNEYS United States Patent Office 3,269,334
Patented August 30, 1966

3,269,334
TURNTABLE
George A. Schmidt, Langhorne, Andrew Abolins, Penndel, and Paul J. Seng, Langhorne, Pa., assignors to Strick Corporation, Fairless Hills, Pa., a corporation of Pennsylvania
Filed July 27, 1964, Ser. No. 385,362
5 Claims. (Cl. 105—368)

This invention relates to a railroad flatcar and more particularly to a turntable thereon for use in a containerized cargo system wherein a freight-laden trailer body is transferred from an over-the-road wheel assembly to the flatcar.

Such a system is shown and described in the Levitt et al. Patent No. 3,112,040. In that system, the trailer body is uncoupled from the wheeled unit at its rear and by means of the tractor the rear of the body is backed onto the turntable. The body is then rotated towards the railroad car after which it is uncoupled from the tractor and pushed onto the railroad until the kingpin on the trailer body is engaged by a receiver on the railcar. Thus, the trailer body assumes a position longitudinally on the railcar and is secured thereto via the kingpin receiver at the front end and a means removably coupling the rear end to the turntable.

The primary object of the invention is to provide a turntable as above described consisting of an inner member rotatable about an axis vertical to the railroad flatcar, an outer member engageable with laterally spaced portions of the trailer body and elastomeric shock-absorbing members between and securing the outer to the inner member.

An important object of the invention is to provide a turntable of the character described in which the elastomeric members are rubber blocks of the sandwich type whose elastic centers are so oriented that the lateral rolling action of the railroad car, which results from a combination of vertical and lateral jars and at times longitudinal jars as the railroad car passes over alternating joints of rail sections, will be absorbed by the blocks thereby preventing back and forth racking of the trailer bodies, which racking causes frame failure at the corners, puts severe strain on the door hinges and causes undue wear on the hardware components of the rear assembly of the trailer body. The blocks also act to reduce transmission of these same forces and motions to the trailer lading.

Another object of the invention is to provide a turntable of the character described in which the elastomeric blocks between the inner and outer members act to conform to the changing angle of approach of the rear of the trailer body, and thereby relieve stresses on the turntable pivot pin, as the trailer body is backed onto and ramps up the nose of the turntable in the initial step of transferring the trailer body to the railroad car.

Another object of the invention is to provide a turntable of the character described in which the elastomeric blocks act to absorb horizontal shocks which are particularly produced when the railroad cars are coupled with the trailer bodies mounted thereon.

Yet another object of the invention is to provide a railroad car and turntable thereon consisting of inner and outer members and rubber blocks between and joining the members so oriented as to absorb vertical, lateral and shear forces and a further means interconnecting the inner and outer members acting to limit predetermined relative longitudinal movement between the members.

These and other objects of the invention will become more apparent as the following description proceeds in conjunction with the accompanying drawings, wherein:

FIG. 2 is a diagrammatic group view of a trailer body and wheeled unit used with the instant invention;

FIG. 4 is a sectional view taken on the line 4—4 of FIG. 3; and

FIG. 5 is a diagrammatic view of the system illustrating the position of the elastic axis.

Specific reference is now made to the drawings in which similar reference characters are used for corresponding elements throughout.

Indicated at 10 is a trailer body having a kingpin 12 at its front end, a pair of track angles 14 along the sides and bottom of the body terminating at its rear, a wheeled unit or bogie 16 and means (not shown) for slidably and removably coupling the bogie to the body at its rear via holes 18 in the track angles. The means to slidably and removably couple the bogie to the body between the track angles may be of the type shown and described in the Sheppard et al. Patents Nos. 2,831,700 and 2,841,411 and Bohlen et al. Patent No. 3,004,772.

Figure 1:
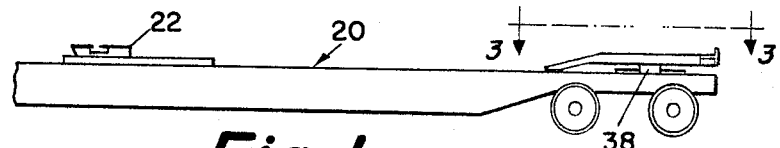
FIG. 1 is a fragmentary diagrammatic view of a railroad flatcar incorporating the instant invention.
Figure 3:
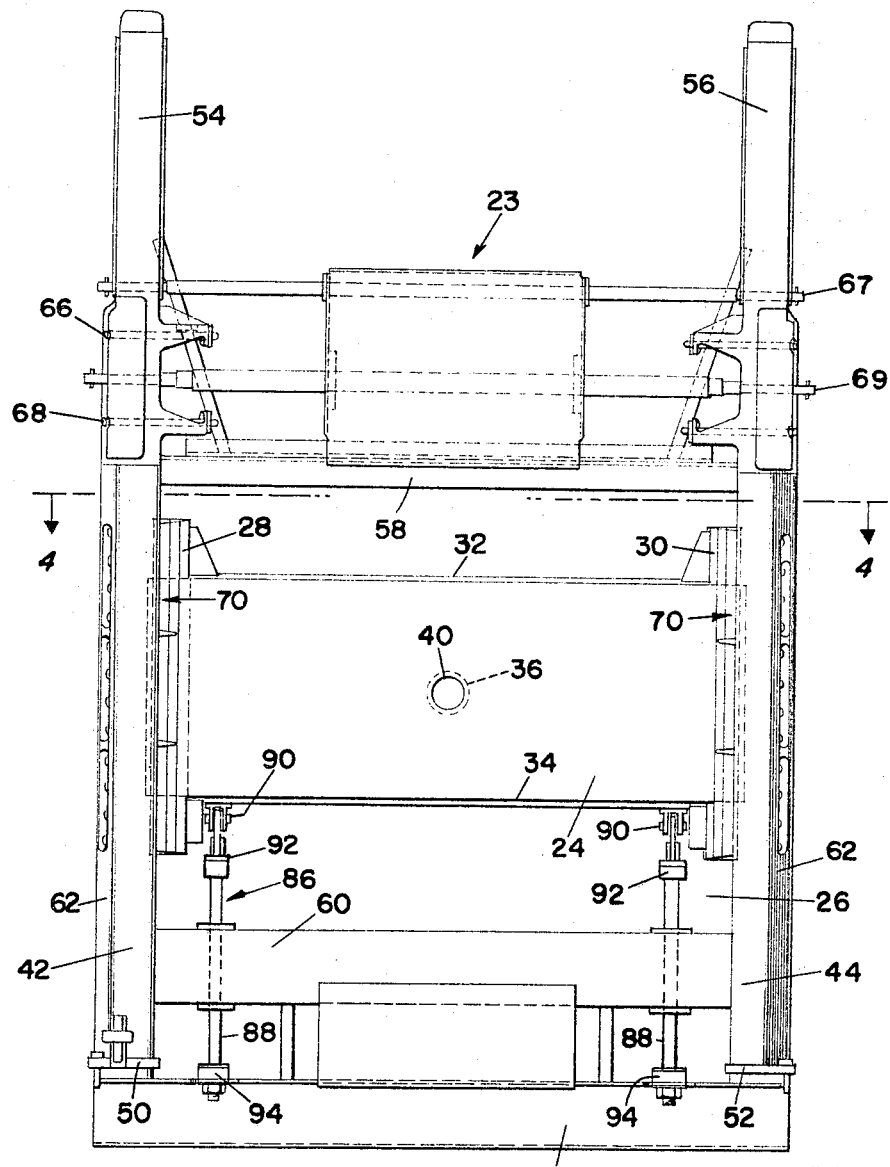
FIG. 3 is a top plan view of the turntable per se.

The cargo laden body may be removed from the bogie and transferred as such to a loading platform or directly onto a ship or railroad flatcar 20, see FIG. 1, equipped with a kingpin receiver 22 and a turntable 23 spaced therefrom. As shown and described in the Levitt et al. Patent No. 3,112,040, when the bogie is uncoupled from the body and the brakes applied thereto, the trailer is backed up until the rear thereof engages the turntable and is coupled thereto. By means of the tractor and a ram mechanism, as shown in FIGS. 14–19 of the aforesaid Levitt et al. patent, the trailer body is rotated and pushed onto the railcar until the kingpin 12 is engaged and latched in the receiver 22, at which position the longitudinal axes of the trailer body 10 and railroad car 20 are substantially parallel or in alignment.

The instant invention relates to the turntable 23. The same includes a pair of upper and lower substantially rectangular spaced parallel plates 24 and 26, the latter being longer than the former as is evident from the drawings. The two plates are secured together in vertically spaced relation by longitudinal side members or bars 28 and 30 which extend beyond the front and rear transverse bars 32 and 34 to form a box. The longitudinal bars 28 and 30 lie at a 55° angle to the plane of the upper and lower plates and converge upwardly. The lower plate is provided with an upstanding collar 36 which serves as a bearing for rotatably journaling a vertical pivot pin 38 carried by the railroad car, there being a hole 40 in the upper plate for access thereto. The pin is loosely received in the bearing to allow for limited pivotal motion of the turntable in a vertical plane as well. The upper and lower plates 24 and 26, the longitudinal bars 28 and 30 and the transverse bars 32 and 34 define a structure referred to hereinafter as the inner turntable member.

The structure which will be referred to as the outer turntable member comprises a pair of laterally spaced longitudinal hollow box-like members 42 and 44 whose upper surfaces 46 and 48 are substantially horizontal and parallel to the plates 24 and 26 for their major length and to the rear thereof where the members are provided with upstanding stops 50 and 52. At their front ends, the upper surfaces of the members 42 and 44 nose down to form inclined ramps 54 and 56. Towards their front ends, the members 42 and 44 are joined by a cross member 58 and towards their rear ends by a transverse box member 60. Traversing the rear ends of members 42 and 44 and connected to the box member 60 is a step plate 61. The contour of each member 42 and 44 is such that it contains an outer wall having a surface 62 which is inclined to extend in substantially the same plane of inclination of the track angles 14 on the trailer body, and an inner wall 64 which is substantially parallel to the corresponding longitudinal bars 28 or 30 of the inner turntable member. Adjacent and to the rear of the ramps are two pairs of spring-loaded laterally and upwardly movable coupling pins 66 and 68 which can be manually retracted by application of a crank to the shaft 69 which is in turn operatively connected to the pins. The pins are tripped via rotation of the shaft 67 to the extended or coupling position for engagement in selected holes 18 in the track angles 14 of the trailer body in response to engagement of the rear of the trailer body with a latching mechanism (not shown) adjacent the stop 50 to which the shaft 67 is operatively connected.

Interposed between the inner wall 64 of each longitudinal member 42 and 44 of the outer turntable member and each of the corresponding longitudinal members 28 and 30 of the inner turntable member and serving to flexibly secure the inner and outer turntable members together are elastomeric members 70. Three such members are employed to connect each longitudinal outer member 42 and 44 to each corresponding longitudinal inner member 28 and 30.

Each elastomeric member is of the sandwich type and comprises substantially rectangular rubber blocks 72 with substantially coextensive metallic plates 74 bonded between adjacent faces of the blocks forming a laminate which increases the compressive strength thereof. In cross section, the elastomeric member is of step construction with the outermost block being the longest and widest. The blocks are preferably made of solid natural rubber for increased life and the entire elastomeric unit is preferably 4⅜" high, 5⁹⁄₁₆" at its widest and 14⅞" at its longest and has a shear rate of 2,000 lbs./in. of shear deflection and a compression rate twenty times that of the shear rate or 40,000 lbs./in. of compression deflection. Carried by the lowermost plate 74 are threaded bolts 76 which extend into appropriate apertures 78 in the longitudinal inner bars 28 and 30 and are secured in place by nuts 80. The uppermost plate 74 is provided with threaded sockets 82, there being headed bolts 84 which extend through the inner wall 64 of the longitudinal outer members 42 and 44 and are received in the sockets to complete the attachment of the outer turntable to the inner turntable.

It will thus be seen from FIG. 4 that in their final positions the shear plane of each elastomeric unit, when relaxed, is substantially parallel to the corresponding longitudinal bar 28 or 30 of the inner turntable and to the corresponding inner wall 64 of the longitudinal member 42 or 44 of the outer turntable. As a result and the fact that the elastomeric units are symmetrically mounted relative to the vertical plane defining the longitudinal center 63 of the turntable, the elastic axis 65 of the system, including the turntable (the rigid body) and the elastomeric units, falls below the turntable and along the vertical plane defining the longitudinal center 63 of the turntable, as seen in FIG. 5. By definition, the elastic axis is a line whereby if a constant force is applied to the rigid body along a line extending through said axis, the body is displaced in translation without rotation; and if a constant moment is applied with respect to the elastic axis the body is displaced in rotation without translation.

A means 86 is provided to limit the relative movement between the inner and outer turntable members, preferably to 8 inches of travel fore and aft. This means comprises a pair of laterally spaced, longitudinally extending rods 88 each pivoted as at 90 for vertical movement to the rear transverse bar 34 of the inner turntable member. The rod extends slidably through the box member 60 of the outer turntable member and mounts an enlarged cylindrical rubber block 92 adjacent its pivot point and another similar rubber block 94 at its free end, there being a cut-out or notch in the flange of the transverse member 58 to allow for clearance of the block 94. Thus, if the outer turntable member should move aft a predetermined distance, say 8 inches, relative to the inner turntable member, the front blocks 92 will strike the front face of the box member 60 and thus prevent further elongation of the elastomeric members 70. Vice versa, if the outer turntable member should move forwardly the same predetermined distance relative to the inner turntable member, the rear blocks 94 will strike the rear face of the box member 60.

In use, when the trailer body 10 is uncoupled from the bogie 16 it is backed up to the railroad car 20 until the rear thereof engages the ramps 56 which are oriented to extend over the side of the car and which act to raise the rear of the body. As the body is thus backed onto the turntable it will be appreciated that the horizontal angle of approach of the rear of the body changes until the body is seated on the turntable and the stops 50 and 52 are contacted. The elastomeric members 70 act to conform the turntable to these changing angles thereby relieving stresses on the turntable pivot pin. In this transfer movement, the spring-loaded coupling pins 66 and 68 have been manually retracted and the track angles 14 are positioned outwardly of and adjacent the corresponding angulated faces 62 of the longitudinal members 42 and 44 of the outer turntable member. When the stops 50 and 52 are contacted a latch mechanism is tripped and the coupling pins move laterally outwardly and through selected apertures 18 in the track angles to effect coupling of the rear of the trailer body to the outer turntable member. The body is then rotated about the turntable axis until the kingpin 12 is engaged and latched in the receiver 22 on the railroad car.

When the car and trailer body mounted thereon, which can attain a weight of approximately 60,000 lbs. when laden with cargo, ride on the rails the car is subjected to vertical and lateral forces as the car passes over alternating joints of rail sections. The elastomeric members 70 and the orientation of their elastic axes act to absorb these impacts and thus prevent back and forth racking of the rear of the trailer body. Also, the elastomeric members act to absorb longitudinal shocks which are produced when the cars with the trailer bodies mounted thereon are coupled to each other.

While a preferred embodiment of the invention has here been shown and described, it will be understood that skilled artisans may make minor variations without departing from the spirit of the invention and the scope of the appended claims.

We claim:

1. In combination with a container, a railroad flatcar including a deck, a pin upstanding therefrom and a turntable supporting one end portion of said container, said turntable comprising an inner unit having longitudinal, vertically extending bars disposed at acute angles to the horizontal and converging upwardly, a member extending transversely between and connecting said bars and including means journaling said pin so that said inner unit is rotatable about the vertical axis of said pin, an outer unit including longitudinal members having walls spaced from and substantially parallel to said bars, and elastomeric members secured between said longitudinal bars and walls having shear axes, when relaxed, which are substantially parallel to said bars and walls, the elastic axis of the system falling below said turntable and on a vertical plane defining the longitudinal center of said turntable, said elastomeric members acting to substantially reduce transmission to said container of the repeated vertical and lateral forces to which the railroad flatcar is subjected as it rolls over alternating joints of rail sections to thereby prevent back and forth racking of said one end portion of said container, which racking puts severe strain on said container causing undue wear and at times corner failure.

2. The combination of claim 1 and means to limit relative longitudinal movement between said inner and outer turntable units.

3. A railroad flatcar having a deck and a pin upstanding therefrom, a turntable comprising an inner unit having laterally spaced, longitudinal, vertically extending bars disposed at acute angles to the horizontal and converging upwardly, a member extending transversely between and connecting said bars and including means journaling said pin so that said inner unit is rotatable about the vertical axis of said pin, and an outer unit including laterally spaced longitudinal members including walls substantially parallel to said bars and elastomeric members secured between said longitudinal bars and said walls, the elastic axis of the system falling below said turntable and on the vertical plane defining the longitudinal center of said turntable, and means to limit relative longitudinal movement between said inner and outer units, said outer unit also including a member extending transversely between and connecting said longitudinal members, said means to limit relative longitudinal movement between said units including at least one rod pivoted for vertical movement to said transverse member of said inner unit and extending slidably through said transverse member of said outer unit and rubber blocks mounted on the rod, one between said transverse members and one to the rear of said transverse member of said outer unit, said rubber blocks being adapted selectively to strike said transverse member of said outer unit upon predetermined fore and aft movement of said outer unit relative to said inner unit.

4. A turntable comprising an inner unit including laterally spaced, longitudinal, vertically extending bars disposed at acute angles to the horizontal and converging upwardly, a horizontal member extending transversely between and connecting said bars and including means to mount said unit for rotation about a vertical pin, an outer unit including laterally spaced, longitudinal members including walls substantially parallel to and spaced from said bars, elastomeric members interposed between said bars and said walls, means securing each of said elastomeric members to one of said bars and a corresponding one of said walls so that the shear axis of said elastomeric member, when relaxed, is substantially parallel to said one bar and said one wall to which it is secured, and means to limit relative longitudinal movement between said inner and outer units, said outer unit also including a member extending transversely between and connecting said longitudinal members, said means to limit relative longitudinal movement between said units including at least one rod pivoted for vertical movement to said transverse member of said inner unit and extending slidably through said transverse member of said outer unit and rubber blocks mounted on the rod, one between said transverse members and one to the rear of said transverse member of said outer unit, said rubber blocks being adapted selectively to strike said transverse member of said outer unit upon predetermined fore and aft movement of said outer unit relative to said inner unit.

5. The combination of claim 4, wherein said elastomeric members are made of rubber having a shear rate of about 2,000 lbs./in. of deflection and a compression rate about 20 times that of the shear rate, the shear axis extending at an angle of about 55° to the horizontal.

References Cited by the Examiner

UNITED STATES PATENTS

| | | | |
|---|---|---|---|
| 2,782,026 | 2/1957 | Hirst | 105—197 |
| 3,112,040 | 11/1963 | Levitt et al. | 214—38 |
| 3,179,067 | 4/1965 | Beck et al. | 105—368 |

ARTHUR L. LA POINT, *Primary Examiner.*

D. E. HOFFMAN, *Assistant Examiner.*